US012710565B2

(12) United States Patent
Eilertsen et al.

(10) Patent No.: US 12,710,565 B2
(45) Date of Patent: Aug. 18, 2026

(54) MULTI-CHANNEL HIGH-RESOLUTION IMAGING DEVICES INCORPORATING METALENSES FOR COLOR IMAGES

(71) Applicant: NIL Technology ApS, Kongens Lyngby (DK)

(72) Inventors: James Eilertsen, Skodsborg (DK); Villads Egede Johansen, Copenhagen (DK); Fredrik Mattinson, Täby (SE); Olivier Francois, Kongens Lyngby (DK); Ulrich Quaade, Bagsvaerd (DK)

(73) Assignee: NIL Technology ApS, Kongens Lyngby (DK)

( * ) Notice: Subject to any disclaimer, the term of this patent is extended or adjusted under 35 U.S.C. 154(b) by 50 days.

(21) Appl. No.: 18/294,308

(22) PCT Filed: Jul. 29, 2022

(86) PCT No.: PCT/EP2022/071474
§ 371 (c)(1),
(2) Date: Feb. 1, 2024

(87) PCT Pub. No.: WO2023/012078
PCT Pub. Date: Feb. 9, 2023

(65) Prior Publication Data

US 2024/0337774 A1 Oct. 10, 2024

Related U.S. Application Data

(60) Provisional application No. 63/228,327, filed on Aug. 2, 2021.

(51) Int. Cl.
*G02B 1/00* (2006.01)
*H04N 23/55* (2023.01)
(Continued)

(52) U.S. Cl.
CPC ............ *G02B 1/002* (2013.01); *H04N 23/55* (2023.01); *H04N 23/951* (2023.01); *H04N 25/134* (2023.01)

(58) Field of Classification Search
CPC ........ G02B 1/002; G02B 5/201; H04N 23/55; H04N 23/951; H04N 25/134; H04N 25/11
See application file for complete search history.

(56) References Cited

U.S. PATENT DOCUMENTS 9,041,823 B2 5/2015 Venkataraman et al.
10,147,167 B2 12/2018 Cutu et al.
(Continued)

FOREIGN PATENT DOCUMENTS

CN 102037717 A 4/2011
CN 104335246 A 2/2015
(Continued)

OTHER PUBLICATIONS

International Preliminary Report on Patentability in International Appln. No. PCT/EP2022/071474, mailed on Feb. 15, 2024, 7 pages.
(Continued)

*Primary Examiner* — Abdelaaziz Tissire
(74) *Attorney, Agent, or Firm* — Fish & Richardson P.C.

(57) ABSTRACT

An apparatus includes, in some implementations, at least one image sensor, a plurality of metalenses, and readout and processing circuitry. The at least one image sensor includes pixel arrays, each of which is associated, respectively, with a different one of multiple optical channels configured for detection of incoming light rays of a respective color. The color for each optical channel differs from that of at least one of the other optical channels. Each of the metalenses is disposed, respectively, in a different one of the optical channels and is configured, respectively, to focus incoming
(Continued)

light rays onto a different one of the pixel arrays. The readout and processing circuitry is operable to read out signals from the pixel arrays and to generate a respective lower-resolution image for each of the optical channels, and to process the lower-resolution images to obtain a higher-resolution multi-color image. Methods of operation are described as well.

16 Claims, 6 Drawing Sheets

(51) Int. Cl.
*H04N 23/951* (2023.01)
*H04N 25/13* (2023.01)

(56) References Cited

U.S. PATENT DOCUMENTS

| | | | |
|---|---|---|---|
| 10,416,565 B2 | 9/2019 | Ahmed et al. | |
| 10,701,326 B1 | 6/2020 | Osmanis et al. | |
| 2002/0060743 A1 | 5/2002 | Hori et al. | |
| 2007/0071362 A1 | 3/2007 | Milanfar et al. | |
| 2010/0072353 A1 | 3/2010 | Tschekalinskij et al. | |
| 2010/0097491 A1* | 4/2010 | Farina | H04N 23/843 348/223.1 |
| 2010/0165134 A1 | 7/2010 | Dowski, Jr. et al. | |
| 2011/0069189 A1 | 3/2011 | Venkataraman et al. | |
| 2011/0080487 A1 | 4/2011 | Venkataraman et al. | |
| 2012/0105691 A1 | 5/2012 | Waqas et al. | |
| 2016/0241751 A1 | 8/2016 | Park | |
| 2017/0148139 A1* | 5/2017 | Cutu | G06T 5/50 |
| 2018/0045953 A1 | 2/2018 | Fan et al. | |
| 2018/0172988 A1 | 6/2018 | Ahmed et al. | |
| 2018/0184052 A1* | 6/2018 | Sato | G02B 5/0278 |
| 2018/0284428 A1 | 10/2018 | Guenter | |
| 2019/0197717 A1 | 6/2019 | Cho | |
| 2019/0309925 A1 | 10/2019 | Keh et al. | |
| 2019/0383601 A1 | 12/2019 | Kwon et al. | |
| 2019/0383969 A1 | 12/2019 | Badano et al. | |
| 2020/0225386 A1 | 7/2020 | Tsai et al. | |
| 2020/0388642 A1* | 12/2020 | Fu | H04N 25/61 |
| 2021/0028215 A1 | 1/2021 | Devlin et al. | |
| 2021/0080637 A1 | 3/2021 | Brick et al. | |
| 2021/0118932 A1* | 4/2021 | Cho | H10F 39/182 |
| 2021/0149441 A1 | 5/2021 | Bartscherer et al. | |
| 2022/0078318 A1 | 3/2022 | Wang et al. | |
| 2022/0110522 A1 | 4/2022 | Hu et al. | |
| 2023/0230991 A1 | 7/2023 | Fu et al. | |
| 2025/0080865 A1* | 3/2025 | Quaade | H04N 25/10 |

FOREIGN PATENT DOCUMENTS

| | | |
|---|---|---|
| CN | 110099201 | 8/2019 |
| CN | 111426381 | 7/2020 |
| CN | 213186257 | 5/2021 |
| EP | 3812721 | 4/2021 |
| EP | 3855246 | 7/2021 |
| GB | 2525862 | 11/2015 |
| JP | 2011-523538 A | 8/2011 |
| JP | 2021-511530 | 5/2021 |
| JP | 2022-535238 A | 8/2022 |
| KR | 10-1889886 | 8/2018 |
| KR | 10-2021-0033914 | 3/2021 |
| KR | 20220017480 A | 2/2022 |
| WO | WO 2020/214615 | 10/2020 |
| WO | WO 2020/247109 A1 | 12/2020 |
| WO | WO 2020/247172 | 12/2020 |

OTHER PUBLICATIONS

International Preliminary Report on Patentability in International Appln. No. PCT/EP2022/071563, mailed on Feb. 15, 2024, 6 pages.
International Search Report and Written Opinion in International Appln. No. PCT/EP2022/071474, mailed on Nov. 22, 2022, 13 pages.
International Search Report and Written Opinion in International Appln. No. PCT/EP2022/071563, mailed on Nov. 18, 2022, 11 pages.
Wikipedia.org [online], “Superlens,” available on or before Dec. 5, 2005, via Internet Archive: Wayback Machine URL <https://web.archive.org/web/20201111233422/https://en.wikipedia.org/wiki/Superlens>, retrieved on Nov. 11, 2022, URL<https://en.wikipedia.org/wiki/Superlens>, 30 pages.
Office Action in Japanese Appln. No. 2024-506510, mailed on May 12, 2026, 8 pages (with English translation).

* cited by examiner

| 106A | 106B |
| --- | --- |
| 106C | 106D |

FIG. 1A

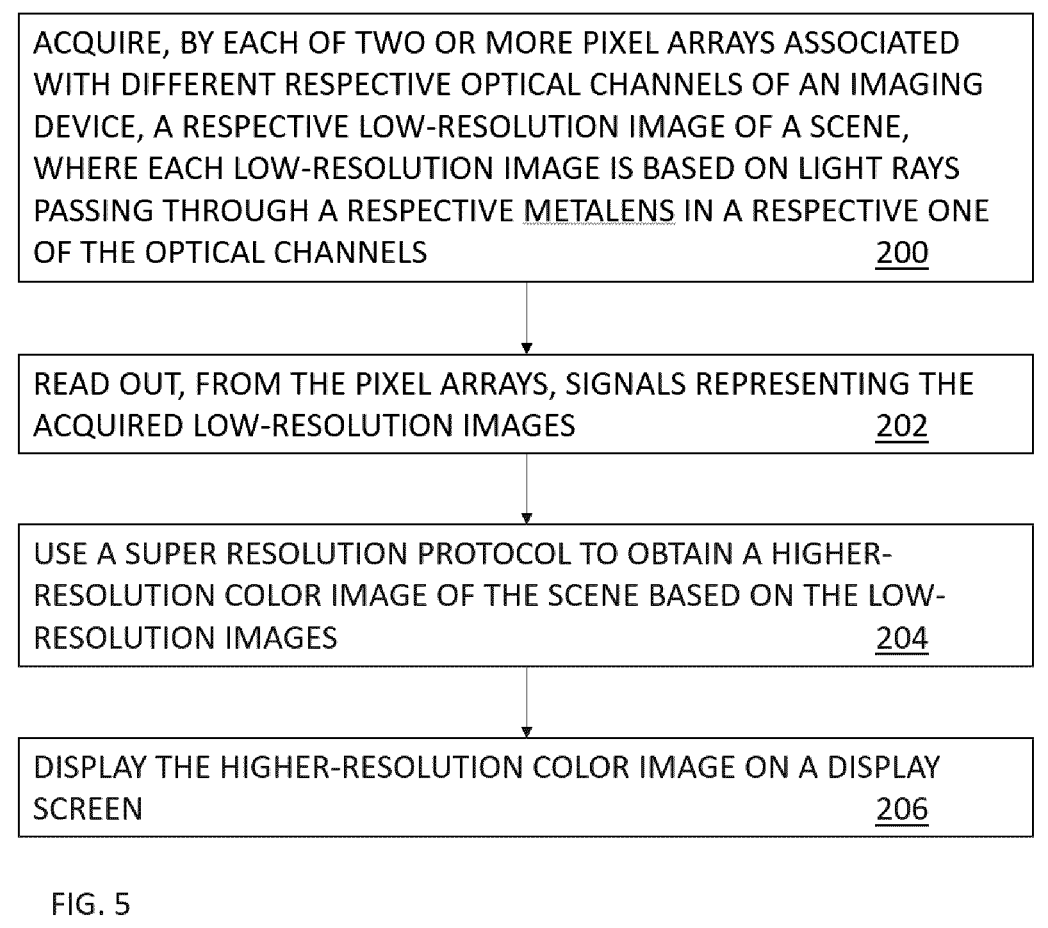

ACQUIRE, BY EACH OF TWO OR MORE PIXEL ARRAYS ASSOCIATED WITH DIFFERENT RESPECTIVE OPTICAL CHANNELS OF AN IMAGING DEVICE, A RESPECTIVE LOW-RESOLUTION IMAGE OF A SCENE, WHERE EACH LOW-RESOLUTION IMAGE IS BASED ON LIGHT RAYS PASSING THROUGH A RESPECTIVE METALENS IN A RESPECTIVE ONE OF THE OPTICAL CHANNELS 200

READ OUT, FROM THE PIXEL ARRAYS, SIGNALS REPRESENTING THE ACQUIRED LOW-RESOLUTION IMAGES 202

USE A SUPER RESOLUTION PROTOCOL TO OBTAIN A HIGHER-RESOLUTION COLOR IMAGE OF THE SCENE BASED ON THE LOW-RESOLUTION IMAGES 204

DISPLAY THE HIGHER-RESOLUTION COLOR IMAGE ON A DISPLAY SCREEN 206

FIG. 5

MULTI-CHANNEL HIGH-RESOLUTION IMAGING DEVICES INCORPORATING METALENSES FOR COLOR IMAGES

CROSS-REFERENCE TO RELATED APPLICATIONS

This application is a National Stage application under 35 U.S.C. § 371 of International Application No. PCT/EP2022/071474, filed on Jul. 29, 2022, which claims the benefit of priority from U.S. Provisional Patent Application No. 63/228,327, filed on Aug. 2, 2021, the contents and disclosures of which are incorporated herein by reference in their entirety.

FIELD OF THE DISCLOSURE

The present disclosure relates to multi-channel imaging devices.

BACKGROUND

Multi-channel imaging devices can acquire images using image sensors. For example, light entering through an aperture at one end of an image device is directed to one or more image sensors, which include pixels that generate signals in response to sensing received light. The imaging devices sometimes are incorporated into handheld or other portable electronic devices such as smartphones. However, space in such portable devices often is at a premium. Thus, reducing the size or dimensions of the imaging device can be important for such applications.

SUMMARY

The present disclosure describes multi-channel high-resolution imaging devices incorporating metalenses.

In one aspect, for example, the present disclosure describes an apparatus that includes at least one image sensor, a plurality of metalenses, and readout and processing circuitry. The at least one image sensor includes pixel arrays, each of which is associated, respectively, with a different one of multiple optical channels configured for detection of incoming light rays of a respective color. The color for each optical channel differs from that of at least one of the other optical channels. Each of the metalenses is disposed, respectively, in a different one of the optical channels and is configured, respectively, to focus incoming light rays onto a different one of the pixel arrays. The readout and processing circuitry is operable to read out signals from the pixel arrays and to generate a respective lower-resolution image for each of the optical channels, and to process the lower-resolution images to obtain a higher-resolution multi-color image.

Some implementations include one or more of the following features. For example, in some instances, each of the metalenses is configured to focus incoming light rays of a different respective wavelength, or falling within a different respective range of wavelengths, onto a respective one of the pixel arrays. In some instances, each particular one of the optical channels includes a respective optical filter configured to allow incoming light rays of the respective color associated with the particular channel to pass. In some cases, each of the optical filters is disposed between the image sensor and a different respective one of the metalenses, whereas in some cases, each of the optical filters is disposed over a different respective one of the metalenses.

In some implementations, tach of the pixel arrays is operable to acquire an image of a scene, wherein there is a sub-pixel shift in the image acquired by a first one of the pixel arrays relative to the image acquired by a second one of the pixel arrays. In some implementations, the at least one image sensor includes a plurality of image sensors, each of which includes a different respective one of the pixel arrays. In some cases, the at least one image sensor is a single image sensor that includes each of the pixel arrays. In some implementations, the apparatus includes at least three optical channels associated, respectively, with wavelengths of red, green and blue light.

In some implementations, the readout and processing circuitry is e operable to process the lower-resolution images to obtain a higher-resolution multi-color image using a super-resolution protocol.

The present disclosure also describes a method that includes acquiring, by each of a plurality of pixel arrays associated with different respective optical channels of an imaging device, a respective lower-resolution image of a scene. Each of the lower-resolution images is based on light rays passing through a respective metalens in a respective one of the optical channels, and each of the optical channels is configured, respectively, for light of a different color. The method includes reading out, from the pixel arrays, signals representing the acquired lower-resolution images, using a super-resolution protocol to obtain a higher-resolution multi-color image of the scene based on the lower-resolution images.

Some implementations include one or more of the following features. For example, in some instances, the method includes displaying the higher-resolution multi-color image on a display screen of a computing device (e.g., on a display screen of a smartphone).

In some implementations, each respective one of the metalenses focuses incoming light rays of a different respective wavelength, or falling within a different respective range of wavelengths, onto a respective one of the pixel arrays. In some instances, each of the metalenses comprises meta-atoms arranged to resonate at a fixed frequency corresponding to the respective wavelength. In some cases, there is a sub-pixel shift in the lower-resolution image acquired by a first one of the pixel arrays relative to the lower-resolution image acquired by another one of the pixel arrays.

Some implementations include one or more of the following advantages. For example, using metalenses can be advantageous because they can be relatively flat, ultrathin, lightweight, and/or compact. Further, at least in some implementations, a color image can be obtained without using a series of metalenses arranged in a vertical stack to reduce chromatic aberrations. Thus, using metalenses as described in the present disclosure can help reduce the total track length (TTL) of the imaging device. Further, in some implementations, the metalenses can be used in conjunction with one or more relatively low-cost, low-resolution image sensors in a manner that allows for high-resolution multi-color images to be obtained.

The details of one or more implementations are set forth in the accompanying drawings and the description below. Other aspects, features and advantages will be apparent from the following detailed description, the accompanying drawings, and the claims.

BRIEF DESCRIPTION OF THE DRAWINGS

FIG. 1A shows a top view of a multi-channel imaging device.

FIG. 5 is a flow chart of an example method for operation of the imaging devices of FIGS. 1 through 4.

DETAILED DESCRIPTION

Figure 1:
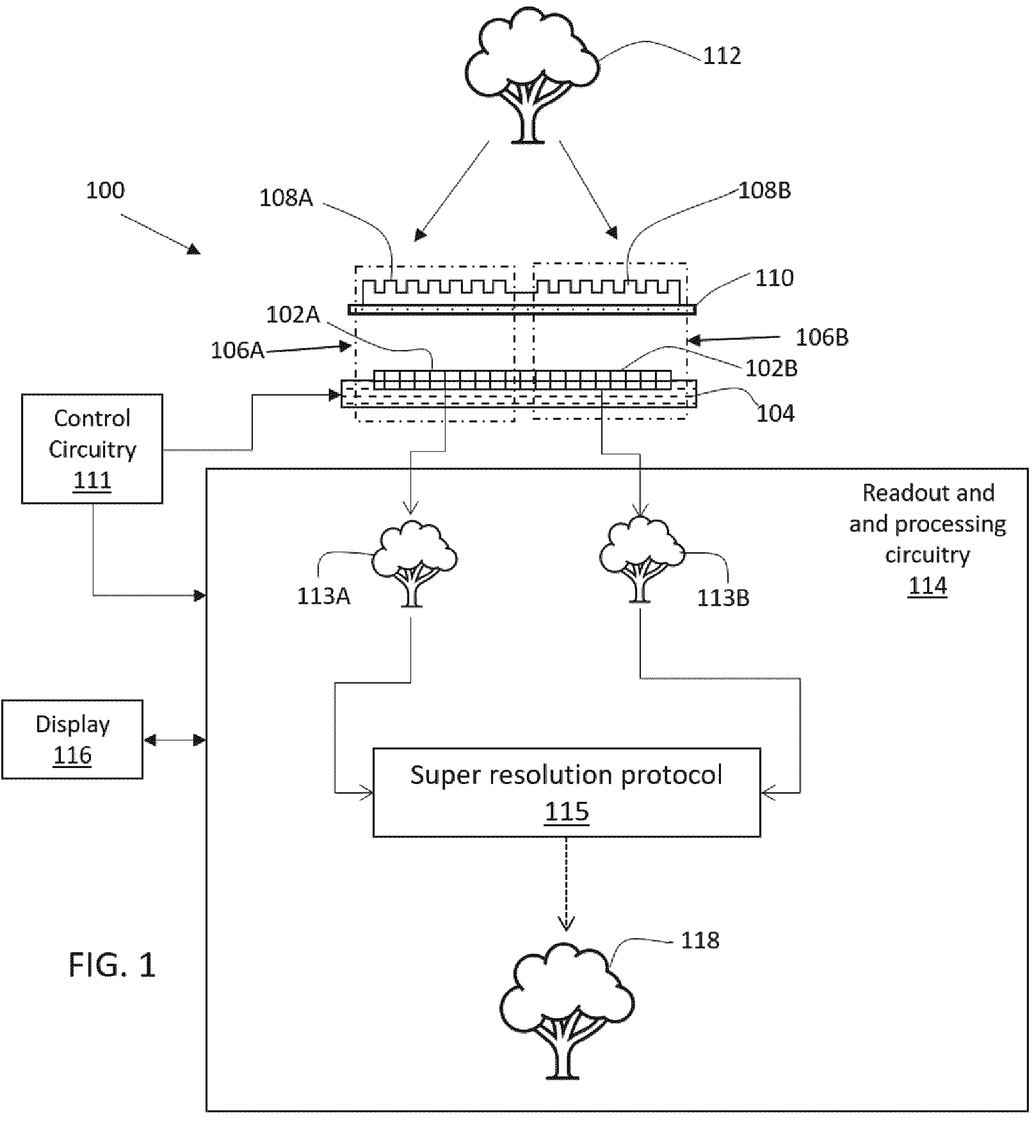
FIG. 1 illustrates a first example of a multi-channel imaging device.

As illustrated in the example of FIG. 1, a multi-channel imaging device 100 is operable to capture images by respective pixel arrays 102A, 102B that are associated with different channels and that are part of one or more image sensors. Although only two optical channels 106A, 106B are shown in FIG. 1, the device 100 can include a greater number of channels. For example, as shown in FIG. 1A, there may be four optical channels 106A, 106B, 106C, 106D, each of which has a respective pixel array associated with it.

In the illustrated example, a single image sensor 104 is shown and includes the pixel arrays for each of the optical channels. In some implementations, each pixel array (e.g., 102A, 102B) is part of a different respective small image sensor, rather than a single larger image sensor. In any event, each image sensor can be implemented, for example, as a relatively low-cost, low-resolution CCD (charge-coupled device) image sensor or CMOS (complementary metal-oxide-semiconductor) image sensor. That is, although more expensive, high-resolution image sensors can be employed, it is not necessary to do so.

Each optical channel is configured for detection of incoming light rays of a respective particular wavelength or a respective particular range of wavelengths. For each channel, a respective metalens is provided to focus incoming light rays onto a respective one of the pixel arrays 102A, 102B. That is, a first metalens 108A, is disposed over the first part of the image sensor 104 that includes the first pixel array 102A, and a second metalens 108B, is disposed over the second part of the image sensor 104 that includes the second pixel array 102B. If there are more than two channels, a respective metalens can be disposed over each of the pixel arrays.

Each metalens 108A, 108B has a metasurface, which refers to a surface with distributed small structures (e.g., meta-atoms) arranged to interact with light in a particular manner. For example, a metasurface, which also may be referred to as a metastructure, can be a surface with a distributed array of nanostructures. The nanostructures are configured to interact, individually or collectively, with light waves so as to change a local amplitude, a local phase, or both, of an incoming light wave.

The meta-atoms (e.g., nanostructures) can be arranged to act as a metalens that resonates at a fixed frequency with a relatively sharp bandwidth. That is, the dimensions (e.g., diameter and length), shape, and material of the meta-atoms can be designed to induce a phase delay in an incident wave of a particular wavelength so as to focus an incident wave on a particular spot. Each of the metalenses 108A, 108B can be configured for a different particular wavelength or narrow band of wavelengths. For example, in some implementations, each of the metalenses 108A, 108B is configured for a different respective wavelength or narrow band of wavelengths in the visible part of the spectrum and is configured to focus incoming light rays onto a respective one of the pixel arrays. Thus, for example, a first one of the metalenses 108A in the first channel 106A can be configured for a first part of the visible spectrum (e.g., red) and can be configured to focus incoming light rays in the first part of the visible spectrum onto the first pixel array 102A. A second one of the metalenses 108B in the second channel 106B can be configured for a different second part of the visible spectrum (e.g., green) and can be configured to focus incoming light rays in the second part of the visible spectrum onto the second pixel array 102B. Other channels (e.g., 106C, 106D) likewise can include a metalens configured for a respective wavelength or narrow band of wavelengths in the visible part of the spectrum and can be configured to focus incoming light rays in the particular part of the spectrum onto a respective pixel array associated with the particular channel.

In some implementations, the device 100 includes four optical channels 106A-106D that are designed, respectively, for red, green, blue, and green light. The channels may be designed for other combinations of colors of light, and in some instances, at least one of the channels can be configured for non-visible (e.g., infra-red) light. In any event, each of the metalenses can be configured to focus, onto a respective one of the pixel arrays, incoming light rays of a respective particular wavelength, or falling within a respective particular (e.g., narrow) range of wavelengths centered on the particular wavelength.

Figure 2:
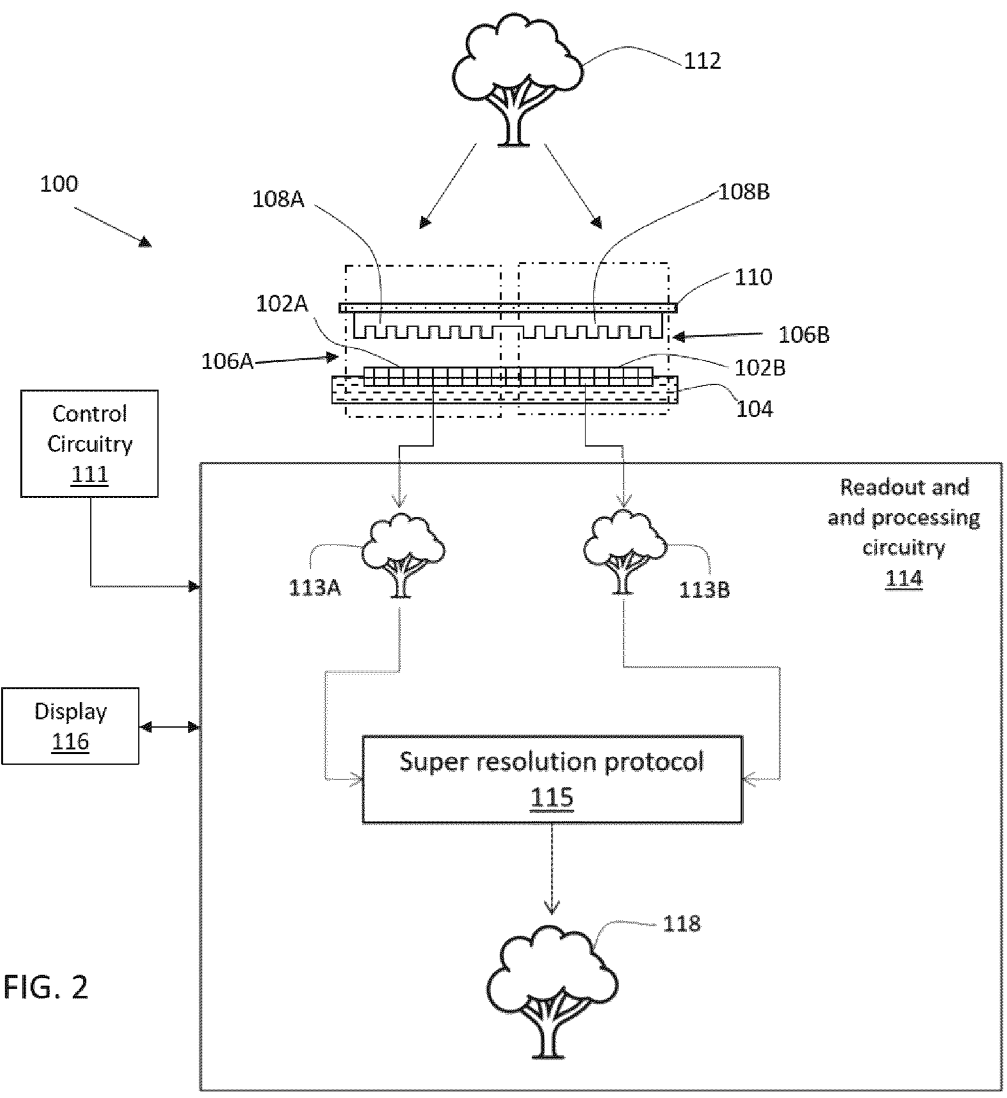
FIG. 2 illustrates a second example of an imaging device.

The metalenses 108A, 108B can be supported, for example, by a glass or other substrate 110. Although the example of FIG. 1 shows the metalenses 108A, 108B on the upper surface of the substrate 110, in some case, the metalenses are disposed on the lower surface of the substrate 110, as shown in FIG. 2. In some cases, metalenses may be disposed on both sides of the substrate 110.

As noted above, each of the optical channels is configured to acquire substantially monochromatic images of a particular color that differs from the color of images acquired by at least one other channel. In particular, the first pixel array 102A can capture an image based on light rays passing through the first optical channel 106A, and the second pixel array 102B can capture an image based on light rays passing through the second optical channel 106B. Likewise, if the device 100 includes additional channels (e.g., 106C and 106D, a third pixel array can capture an image based on light rays passing through the third optical channel 106C, and a fourth pixel array can capture an image based on light rays passing through the fourth optical channel 106D. Further, each pixel array is operable to acquire an image of a scene from a viewpoint that differs slightly from that of the other pixel array. That is, the image of the scene acquired by a particular one of the pixel arrays differs somewhat from images of the same scene acquired by the other pixel array. The slight difference in viewpoints results in a small shift (i.e., sometimes referred to as "motion") in the images of the scene acquired by the pixel arrays. The size of the shift may be, for example, sub-pixel.

On the one hand, introducing metalenses into an imaging device as described here is counterintuitive because metalenses are generally known to exhibit relatively large chromatic aberrations, and because they typically generate relatively small images, which makes it difficult in some cases to use the entire active area of a standard image sensor. Nevertheless, by associating each metalens with an optical channel that encompasses only a portion of the total pixels of the image sensor(s), and configuring each of the optical channels in the imaging device for a single wavelength or a relatively narrow band of wavelengths, the imaging device 100 can take advantage of benefits that metalenses can offer. In particular, using metalenses 108A, 108B rather than other types of lenses (e.g., refractive lenses) in the imaging device

100 can be advantageous because the metalenses can be relatively flat, ultrathin, lightweight, and compact. Further, as explained below, a color image can be obtained without using a series of metalenses arranged in a vertical stack to reduce chromatic aberrations. Thus, using metalenses can help reduce the total track length (TTL) or z-height of the imaging device 100. Further, as explained below, the metalenses can be used in conjunction with one or more relatively low-cost, low-resolution image sensors 104 in a manner that allows for relatively high-resolution color images to be obtained.

Figure 3:
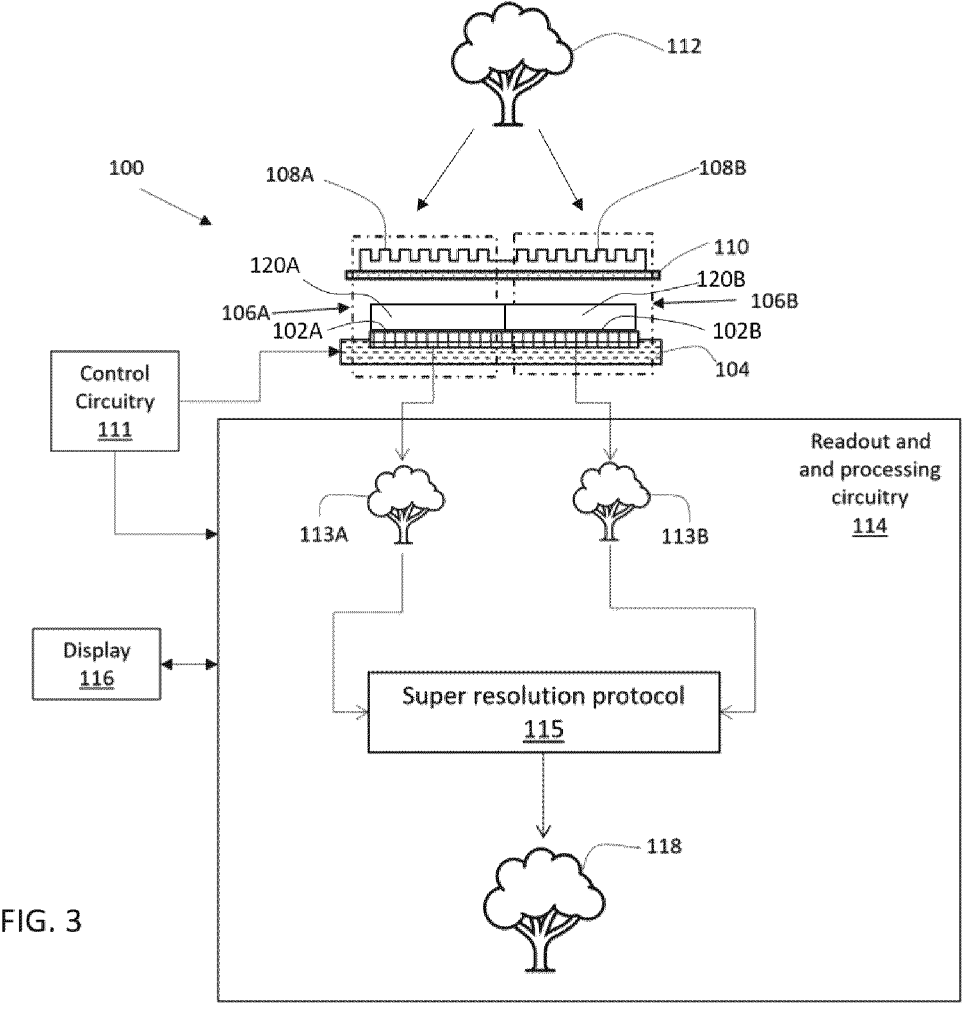
FIG. 3 illustrates a third example of an imaging device.
Figure 4:
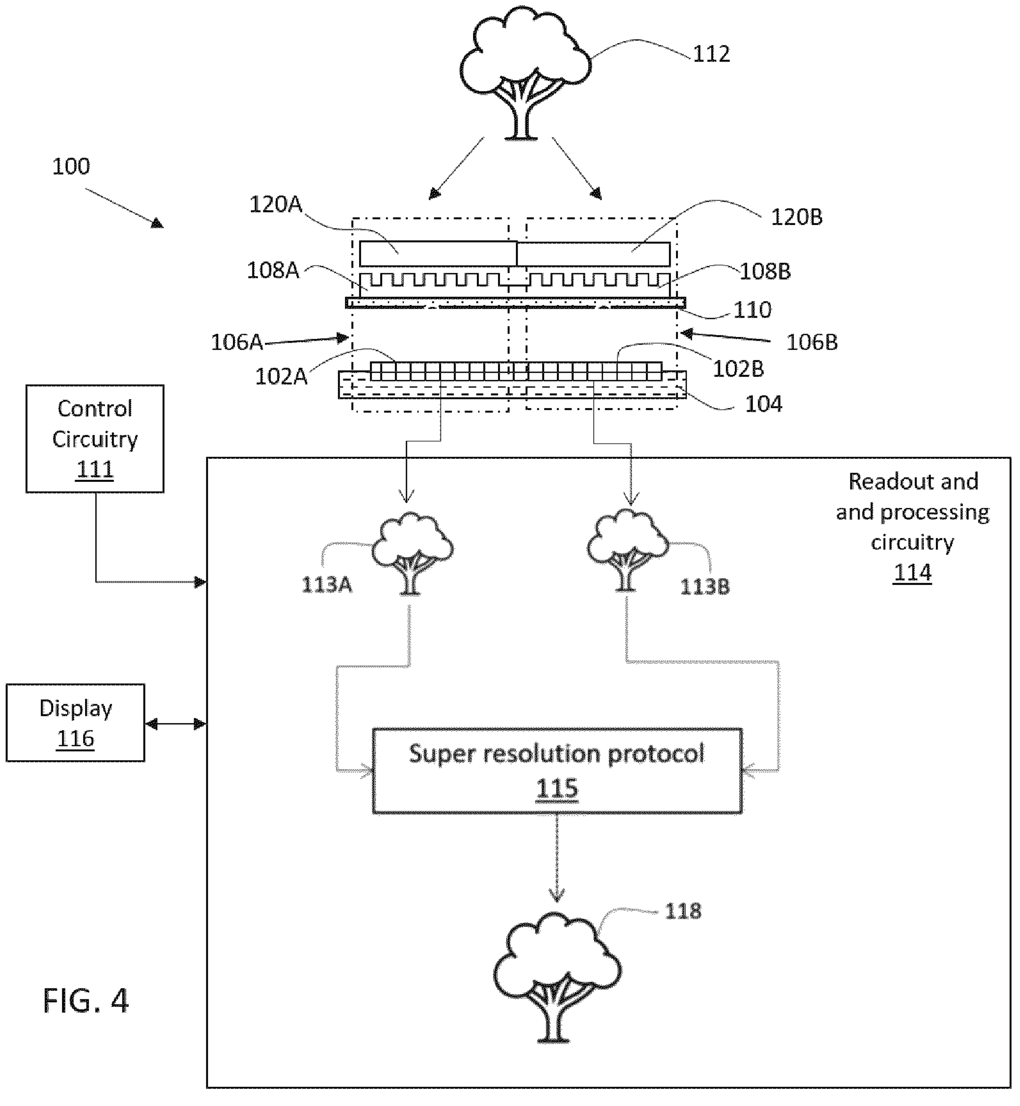
FIG. 4 illustrates a fourth example of an imaging device.

In some cases, it can be beneficial to include an optical filter in each of the optical channels. The filters can help eliminate or reduce optical noise that may be present. For example, if the channel 106A is designed to detect red radiation, a red filter 120A can be included in the channel, as shown in FIG. 3. Similarly, if the channel 106B is designed to detect green radiation, a green filter 120B can be included in the channel. Some channels may include a color filter designed for another part of the visible portion of the spectrum (e.g., blue) or a non-visible part of the spectrum (e.g., infra-red). FIG. 3 shows filters 120A, 120B as being disposed on the image sensor 104, that is, between the image sensor 104 and the metalenses 108A, 108B. In some implementations, the filters 120A, 120B can be disposed over the metalenses 108A, 108B, as shown in FIG. 4.

The imaging device 100 can include control circuitry 111 (e.g., logic) operable to control the image sensor(s) 104 to acquire images of a scene 112 containing one or more objects. In some implementations, the control circuitry 111 may be responsive to user input (e.g., a user interacting with, or otherwise providing input to, a user interface of a smart phone of other computing device coupled to the control circuitry).

The imaging device 100 also can include readout and processing circuitry 114, which can include, for example, a microprocessor and one or more associated memories storing instructions for execution by the microprocessor. The control circuitry 111 can be coupled to the readout and processing circuitry 114 to provide, for example, timing and control signals for reading out the pixel signals. Thus, signals from the pixel arrays 102A, 102B in the various channels 106A, 106B of the imaging device 100 can be read out by the readout and processing circuitry 114, which can include, for example, one or more integrated circuits in one or more semiconductor chips with appropriate digital logic and/or other hardware components (e.g., readout registers; amplifiers; analog-to-digital converters; clock drivers; timing logic; and/or signal processing circuitry).

Depending on the implementation, the readout circuitry can include, for example, active MOS readout amplifiers per pixel. In some implementations, the readout circuitry is operable for intra-pixel charge transfer along with an in-pixel amplifier to achieve correlated double sampling (CDS). The readout circuit can include, in some instances, a source follower or a charge amplifier with row- and column-selection. In some cases, the readout circuit includes a digital readout integrated circuit (DROIC) or a digital pixel readout integrated circuit (DPROIC). In some instances, the pixels are demodulation pixels. Other pixel readout circuits can be used in some implementations.

The readout and processing circuitry 114 is operable to process the pixel signals and to generate, for example, a small, low-resolution image (e.g., 113A, 113B) for each channel. Thus, the readout and processing circuitry 114 is operable to read out signals from each of the pixels in the pixel arrays (e.g., 102A, 102B), where the signals from pixels in a particular one of the pixel arrays correspond to a relatively small, low-resolution image of the scene 112.

The readout and processing circuitry 114 also is operable to process the low-resolution images to obtain a higher-resolution monochromatic image 118 using, for example, a super-resolution protocol 115. Super-resolution reconstruction refers generally to a process of combining information from multiple low-resolution images to obtain a higher resolution image. In the present instance, the super-resolution protocol 115 is operable to generate a higher resolution multi-color image from the lower resolution images (e.g., 113A, 113B). Various super-resolution techniques can be used. For example, U.S. Pat. No. 10,147,167, the disclosure of which is incorporated by reference herein, describes a method of generating a super-resolved reconstructed image. The method is suitable for generating, in the context of the present disclosure, a higher resolution multi-color image from the lower resolution images.

The super-resolution method can include, for example, extracting high-frequency band luma components from the acquired monochromatic low-resolution images of a scene, generating a high-resolution luma image using the high-frequency band luma components and motion data for the acquired images, and replacing luma data in an up-sampled color image, generated from the acquired monochromatic images, with high-resolution luma data in the high-resolution luma image to obtain a super-resolved reconstructed color image.

In some cases, extracting the high-frequency band luma components includes convolving raw monochromatic image data of the monochromatic images of the scene using a Gaussian filter to obtain a Gaussian filtered image, and subtracting the raw monochromatic image data from the Gaussian filtered image.

The super-resolution technique can include, in some instances, constructing an array of raw monochromatic images, including the raw monochromatic image data, based on the acquired images. Extracting the high-frequency band luma components further can include eliminating polarity differences after subtracting the raw monochromatic image data from the Gaussian filtered image. Eliminating polarity differences can include calculating an absolute value of a difference previously obtained by subtracting the raw monochromatic image data from the Gaussian filtered image. Extracting the high-frequency band luma components further can include, after eliminating the polarity differences, equalizing magnitudes of intensity of the high-frequency band luma components and/or applying a sigmoid function.

The super-resolution technique can include executing a motion estimation protocol based on the high-frequency band luma components and based on common channels in the raw monochromatic image data to obtain further motion data; and executing a super-resolution protocol to obtain the high-resolution luma image based on the high frequency luma components and the further motion data in a linear transform. In some cases, the extracted high-frequency band luma components correspond to at least one of edge locations or texture features. The super-resolution technique may include performing color image fusion based on raw monochromatic image data of the monochromatic images to obtain a low-resolution chroma image, and up-sampling the low-resolution chroma image to obtain the up-sampled color image.

Other super-resolution techniques can be used for some implementations.

The super-resolution reconstructed color image generated by the readout and processing circuitry 114 can be provided, for example, to a display 116, which displays the super-resolution reconstructed color image. The display 116 can include, for example, a screen of a computing device (e.g., a smartphone, tablet, personal computer, or other small computing device).

The imaging device 100 can be used in any of a wide range of applications including, for example, cameras in smartphones and other handheld or portable computing devices, as well as medical imaging, satellite imaging, surveillance, facial recognition, high definition television, and others. In some instances, at least a portion of the readout and processing circuitry 114 for the imaging device 100 may be integrated into the smartphone or other computing device's own processing circuitry. In other instances, the readout and processing circuitry 114 may be separate from such circuitry in the computing device.

FIG. 5 illustrates an example of a method of using the imaging devices 100 of FIG. 1, 2, 3 or 4. As indicated by 200, each of two or more pixel arrays associated with different respective optical channels of the imaging device acquires a respective low-resolution image of a scene that includes one or more objects. Each low-resolution image is based (at least in part) on light rays passing through a respective metalens in a respective one of the optical channels. The low-resolution images for the optical channels are substantially monochromatic, where each channel acquires an image based on light of a respective color (e.g., wavelength or narrow range of wavelengths) that differs from that of at least one of the other channels. In some instances, the low-resolution images are acquired in response to user input (e.g., input provided by the user through an interactive user interface). As indicated by 202, signals representing the acquired low-resolution images are read out from the pixel arrays. Then, as indicated by 204, a super resolution protocol is used to obtain a higher-resolution color image of the scene based on the lower-resolution images. In some instances, the higher-resolution color image is displayed, for example, on a display screen of a smartphone or other computing device, as indicated by 206.

Various aspects of the subject matter and the functional operations described in this specification can be implemented in digital electronic circuitry, or in computer software, firmware, or hardware, including the structures disclosed in this specification and their structural equivalents, or in combinations of one or more of them. Thus, aspects of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The apparatus can include, in addition to hardware, code that creates an execution environment for the computer program in question, e.g., code that constitutes processor firmware.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program, which may be stored as instructions in one or more memories, can be deployed to be executed on one computer or on multiple interconnected computers.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks: magneto optical disks; and CD ROM and DVD-ROM disks. The processor and the memory can be supplemented by, or incorporated in, special purpose logic circuitry.

Various modifications will be readily apparent from the foregoing detailed description and the drawings. Accordingly, other implementations also are within the scope of the claims.

What is claimed is:

1. An apparatus comprising:

an image sensor including a plurality of pixel arrays, each of the pixel arrays being associated, respectively, with a different one of a plurality of optical channels configured for detection of incoming light rays of a respective color, wherein the color for each optical channel differs from that of at least one of the other optical channels;

a plurality of metalenses, each of which is disposed, respectively, in a different one of the plurality of optical channels and is configured, respectively, to focus incoming light rays onto a different one of the pixel arrays; and readout and processing circuitry operable to read out signals from the plurality of pixel arrays and to generate a respective lower-resolution image for each of the optical channels, and to process the lower-resolution images to obtain a higher-resolution multi-color image, wherein the image sensor and the plurality of metalenses are configured such that each of the pixel arrays is operable to acquire an image of a scene from a viewpoint that differs from the other pixel arrays to produce a sub-pixel shift in the image of the scene acquired by a first one of the pixel arrays relative to the image of the scene acquired by a second one of the pixel arrays.

2. The apparatus of claim 1 wherein each of the plurality of metalenses is configured to focus incoming light rays of a different respective wavelength, or falling within a different respective range of wavelengths, onto a respective one of the pixel arrays.

3. The apparatus of claim 2 wherein each particular one of the plurality of optical channels includes a respective optical filter configured to allow incoming light rays of the respective color associated with the particular channel to pass, and wherein each of the optical filters is disposed between the image sensor and a different respective one of the metalenses.

4. The apparatus of claim 2 wherein each particular one of the plurality of optical channels includes a respective optical filter configured to allow incoming light rays of the respective color associated with the particular channel to pass, and wherein each of the optical filters is disposed over a different respective one of the metalenses.

5. The apparatus of claim 2 wherein each of the pixel arrays is operable to acquire an image of a scene, and wherein there is a sub-pixel shift in the image acquired by a first one of the pixel arrays relative to the image acquired by a second one of the pixel arrays, the apparatus further including at least three optical channels associated, respectively, with wavelengths of red, green and blue light.

6. The apparatus of claim 5 wherein the readout and processing circuitry is operable to process the lower-resolution images to obtain a higher-resolution multi-color image using a super-resolution protocol.

7. The apparatus of claim 1 wherein each particular one of the plurality of optical channels includes a respective optical filter configured to allow incoming light rays of the respective color associated with the particular channel to pass.

8. The apparatus of claim 7 wherein each of the optical filters is disposed between the image sensor and a different respective one of the metalenses.

9. The apparatus of claim 7 wherein each of the optical filters is disposed over a different respective one of the metalenses.

10. The apparatus of claim 1 including at least three optical channels associated, respectively, with wavelengths of red, green and blue light.

11. The apparatus of claim 1 wherein the readout and processing circuitry is operable to process the lower-resolution images to obtain a higher-resolution multi-color image using a super-resolution protocol.

12. A method comprising:

acquiring, by each of a plurality of pixel arrays associated with different respective optical channels of an imaging device, a respective lower-resolution image of a scene, where each of the lower-resolution images of the scene is based on light rays passing through a respective metalens of a plurality of metalenses in a respective one of the optical channels, and wherein each of the optical channels is configured, respectively, for light of a different color;

reading out, from the pixel arrays, signals representing the acquired lower-resolution images; and using a super-resolution protocol to obtain a higher-resolution multi-color image of the scene based on the lower-resolution images, wherein the plurality of pixel arrays and the plurality of metalenses are configured such that each of the pixel arrays is operable to acquire an image of a scene from a viewpoint that differs from the other pixel arrays to produce a sub-pixel shift in the lower-resolution image of the scene acquired by a first one of the pixel arrays relative to the lower-resolution image of the scene acquired by another one of the pixel arrays.

13. The method of claim 12 including displaying the higher-resolution multi-color image on a display screen of a computing device.

14. The method of claim 12 including displaying the higher-resolution multi-color image on a display screen of a smartphone.

15. The method of claim 12 wherein each respective one of the plurality of metalenses focuses incoming light rays of a different respective wavelength, or falling within a different respective range of wavelengths, onto a respective one of the pixel arrays.

16. The method of claim 15 wherein each metalens of the plurality of metalenses comprises meta-atoms arranged to resonate at a fixed frequency corresponding to the respective wavelength.

* * * * *